(12) United States Patent
Janney et al.

(10) Patent No.: US 6,228,299 B1
(45) Date of Patent: May 8, 2001

(54) GELCASTING COMPOSITIONS HAVING IMPROVED DRYING CHARACTERISTICS AND MACHINABILITY

(75) Inventors: Mark A. Janney, Knoxville; Claudia A. H. Walls, Oak Ridge, both of TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/376,165

(22) Filed: Aug. 17, 1999

Related U.S. Application Data

(62) Division of application No. 08/931,255, filed on Sep. 16, 1997, now abandoned.

(51) Int. Cl.$^7$ .............................. C04B 35/634; B22F 1/00
(52) U.S. Cl. ..................... 264/118; 264/109; 264/119; 264/655; 264/657; 264/669; 264/670; 264/678; 419/36; 419/37; 419/65; 252/315.1; 252/315.2; 524/916
(58) Field of Search .................................. 419/36, 37, 65; 264/109, 669, 670, 118, 119, 678, 655, 657; 252/315.1, 315.2; 524/916

(56) References Cited

U.S. PATENT DOCUMENTS

| | | |
|---|---|---|
| 4,454,286 | 6/1984 | Daniels et al. . |
| 4,830,913 | 5/1989 | Ortmans et al. . |
| 4,894,194 | 1/1990 | Janney . |
| 5,028,362 | 7/1991 | Janney et al. . |
| 5,145,908 | 9/1992 | Janney et al. . |

(List continued on next page.)

FOREIGN PATENT DOCUMENTS

95/30631 11/1995 (WO) .

OTHER PUBLICATIONS

O. O. Omatete, A. C. Young, M. A. Janney, and J. H. Adair, "Investigation of Dilute Gelcasting Alumina Suspension", *Am. Ceram. Soc.*, Ceramic Trans. vol. 12–*Ceramic Powder Science* III, pp. 537–544, (1990).

O. O. Omatete, R. A. Strehlow, and B. L. Armstrong, "Forming of Silicon Nitride by Gelcasting," in pp. 245–251 in *Proceedings of the Annual Automotive Tech. Dev. Contractor's Coordination Meeting*, P–243, SAE, Warrendale, PA (1991).

A. C. Young, O. O. Omatete, M. A. Janney, and P.A. Menchofer, "Gelcasting of Alumina," *J. Am. Ceram. Soc. Bull.*, 74 [3] 612–18 (1991).

O. O. Omatete, M.A. Janney, and R.A. Strehhow, "Gelcasting—A New Ceramic Forming Process", *Am. Ceram. Soc. Bull.*, 74 [10] 1641–49 (1991).

O. O. Omatete, T. N. Tiegs, and A.C. Young, "Gelcasting Reaction–Bonded Silicon Nitride Composites," *Ceram. Eng. Sci. Proc.*, 12 [7–8] 1257–64 (1991).

(List continued on next page.)

*Primary Examiner*—James Derrington
(74) *Attorney, Agent, or Firm*—Akerman, Senterfitt & Eidson, P.A.

(57) ABSTRACT

A gelcasting composition has improved drying behavior, machinability and shelf life in the dried and unfired state. The composition includes an inorganic powder, solvent, monomer system soluble in the solvent, an initiator system for polymerizing the monomer system, and a plasticizer soluble in the solvent. Dispersants and other processing aides to control slurry properties can be added. The plasticizer imparts an ability to dry thick section parts, to store samples in the dried state without cracking under conditions of varying relative humidity, and to machine dry gelcast parts without cracking or chipping. A method of making gelcast parts is also disclosed.

59 Claims, 1 Drawing Sheet

SUMMARY OF GREEN MACHINING FOR GELCAST SYSTEMS WITH AND WITHOUT PLASTICIZER

| Cast | #Ceramic** | Monomer | Xlinker MW | Monomer/Xlinker ratio | Monomer Conc. (%) | Plasticizer | Turning Morphology | Edge & Corner Conditions | Surface Finish† | Burn Marks | Rating# (1-10) |
|---|---|---|---|---|---|---|---|---|---|---|---|
| 1 | RCHP-DBM | MAM | 1000 | 3/1 | 15 | None | dust | small chips | 500 milled | yes | 2 |
| 2 | RCHP-DBM | MAM | 1000 | 2/1 | 15 | None | dust | moderate chips | 125 milled | no | 3 |
| 3 | RCHP-DBM | HMAM | 1000 | 3/1 | 20 | None | large shavings | small chips | 63 milled | no | 7 |
| 4 | RCHP-DBM | HMAM | 1000 | 2/1 | 20 | None | small shavings | very small chips | 125 milled | no | 5 |
| 5 | RCHP-DBM | MAM | 400 | 3/1 | 15 | None | dust | huge chips | 500 milled | no | 1 |
| 6 | RCHP-DBM | MAM | 600 | 3/1 | 15 | None | dust | large chips | 500 milled | yes | 1 |
| 7 | RCHP-DBM | HMAM | 400 | 3/1 | 20 | None | small shavings | very small chips | 125 milled | no | 5 |
| 8 | RCHP-DBM | HMAM | 600 | 2/1 | 20 | None | small shavings | moderate chips | 125 milled | no | 3 |
| 9 | RCHP-DBM | MAM/NVP | 1000 | 3/3/2 | 15 | None | dust | moderate chips | 500 milled | yes | 1 |
| 10 | RCHP-DBM | MAM/NVP | 1000 | 1/1/1 | 15 | None | mostly dust | moderate chips | 63 milled | yes | 3 |
| 11 | RCHP-DBM | MAM | 1000 | 3/1 | 15 | 10% glycerine | mostly dust | small chips | 32 ground | no | 7 |
| 12 | RCHP-DBM | MAM | 1000 | 3/1 | 15 | 20% glycerine | small shavings | no chips | 8 ground | no | 10 |
| 13 | RCHP-DBM | MAM | 1000 | 3/1 | 15 | 20% PEG400 | small shavings | no chips | 8 ground | no | 10 |
| 14 | RCHP-DBM | MAM | 1000 | 3/1 | 15 | 20% Tween®80 | small shavings | no chips | 8 ground | no | 10 |
| 16 | SN-E05 | MAM | 1000 | 3/1 | 15 | 20% Tween®80 | large shavings | plastic deformation | 8 ground | no | 10 |
| 17 | RCHP-DBM | MAM | 1000 | 3/1 | 15 | 15% Tween®80 | small shavings | no chips | 8 ground | no | 9 |
| 19 | RCHP-DBM | MAM | 1000 | 3/1 | 20 | None | Dust & some small shavings | small chips & distortions | 63 milled | slight | 7 |
| 20 | RCHP-DBM | HMAM | 1000 | 3/1 | 15 | None | Dust & some small shavings | minor distortions | 63 milled | no | 8 |
| 21 | Denka-9S | HMAM | 1000 | 3/1 | 20 | 15% glycerine | large shavings | plastic deformation | 32 ground | no | 9 |

U.S. PATENT DOCUMENTS

| | | |
|---|---|---|
| 5,294,264 | 3/1994 | Tiegs et al. . |
| 5,366,669 * | 11/1994 | Quadir et al. ............. 264/328.2 |
| 5,401,445 | 3/1995 | Menchhofer . |
| 5,419,860 | 5/1995 | Menchhofer . |
| 5,456,877 | 10/1995 | Tiegs et al. . |
| 5,476,622 | 12/1995 | Moorhead et al. . |
| 5,772,953 | 6/1998 | Sambrook et al. . |
| 6,008,281 * | 12/1999 | Yang et al. ............. 264/670 |
| 6,066,279 * | 5/2000 | Walls et al. ............. 264/670 |

OTHER PUBLICATIONS

O. O. Omatete, A. Bleier, C. G. Westmoreland, and A.C. Young, "Gelcasting Zirconia–Alumina Composites," *Ceram. Eng. Sci. Proc.*, 12 [9–10] 2084–94 (1991).

O. O. Omatete, R. A. Strehlow and C.A. Walls, "Gelcasting of Submicron Alumina, SiAlON, and Silicon Nitride Powders," 37th Army Sagamore Conference Proceedings, pp. 201–212, Plymouth, Mass. (Oct. 91).

O. O. Omatete, R. A. Strehhow, and C. A. Walls, "Drying of Gelcast Ceramics", *Trans. Am. Ceram. Soc.*, 26 101–107 (1992).

A. Bleier, O. O. Omatete, and C. G. Westmoreland, "Rheology of Zirconia–Alumina Gelcasting Slurries," *Mat. Res. Soc. Symp. Proc.*, 271 269–275 (1992).

A. Bleier, O. O. Omatete, and C. G. Westmoreland, "Rheology and Microstructure of Concentrated Zirconia–Alumina Suspensions for Gelcasting Composites", *Mat. Res. Soc. Symp. Proc.*, 289 109–115 (1993).

O. O. Omatete and A. Bleier, "Tailoring Suspension Flow for the Gelcasting of Oxide Nonoxide Ceramics," *Mat. Res. Soc. Symp. Proc.*, 346 357–363 (1994).

O. O. Omatete and A. Bleier, "Evaluation of Dispersants for Gelcasting Alumina," in *Dispersion and Aggregation: Fundamentals and Applications*, B. M. Moudgil and P. Somasundaran, ed., Engineering Foundations, N.Y. (1994), pp. 269–278.

S. D. Nunn, O. O. Omatete, C. A. Walls, and D. L. Barker, "Tensile Strength of Dried Gelcast Green Bodies," *Ceram. Eng. Sci. Proc.*, 15 [4] 493–498 (1994).

J.O. Kiggans, Jr., S. D. Nunn, T. N. Tiegs, C. C. Davisson, D. W. Coffey, and J–P Maria, "Gelcasting of Silicon Preforms for the Production of Sintered Reaction–Bonded Silicon Nitride," *P/M in Aerospace, Defense and Demanding Applications*—1995, F. H. Froes, ed., Metal Powder Industries Federation, Princeton, N.J. 1995, pp. 157–164.

J–P Maria, J. O. Kiggans, Jr., T. N. Tiegs, and S.D. Nunn, "Gelcasting of Sintered Reaction–Bonded Silicon Nitride for Improved Mechanical Properties," *Ceram. Eng. Sci. Proc.*, 16 [5] 1071–76 (1995).

Mark A. Janney, "Gelcasting Superalloy Powders," *P/M in Aerospace, Defense and Demanding Applications*—1995, F. H. Froes, ed., Metal Powder Industries Federation, Princeton, N.J. 1995, pp. 139–146.

S. D. Nunn, J. O. Kiggans, Jr., R. E. Simpson, II, and J–P Maria, "Gelcasting of Silicon Compositions for SRBSN," *Ceram. Trans.*, 62 255–262 (1996).

S. D. Nunn and G. H. Kirby, "Green Machining of Gelcast Ceramic Materials," Ceram. Eng. Sci. Proc., 17 [3] 209–213 (1996).

O. O. Omatete, M. A. Janney and S. D. Nunn, "Gelcasting: From Laboratory Development Toward Industrial Production," *J. European Ceram. Soc.* 17 407–413 (1997).

*Plastics, Additives and Modifiers Handbooks*, Van Nostrand Reinhold, New York, 1992.

*Plastic Additives Handbook*, 4th Edition, R. Gatcher and H. Muller, Hanser/Gardner Publications, Inc., Cincinnati (1993).

*Encyclopedia of Polymer Science and Engineering*, 1987, John Wiley & Sons, "Hydrogels," pp. 782–806.

* cited by examiner

SUMMARY OF GREEN MACHINING FOR GELCAST SYSTEMS WITH AND WITHOUT PLASTICIZER

| Cast | #Ceramic** | Monomer | Xlinker MW | Monomer/Xlinker ratio | Monomer Conc. (%) | Plasticizer | Turning Morphology | Edge & Corner Conditions | Surface Finish | Burn Marks | Rating# (1-10) |
|---|---|---|---|---|---|---|---|---|---|---|---|
| 1  | RCHP-DBM | MAM     | 1000 | 3/1   | 15 | None          | dust              | small chips                       | 500 milled | yes    | 2  |
| 2  | RCHP-DBM | MAM     | 1000 | 2/1   | 15 | None          | dust              | moderate chips                    | 125 milled | no     | 3  |
| 3  | RCHP-DBM | HMAM    | 1000 | 3/1   | 20 | None          | large shavings    | small chips                       | 63 milled  | no     | 7  |
| 4  | RCHP-DBM | HMAM    | 1000 | 2/1   | 20 | None          | small shavings    | very small chips                  | 125 milled | no     | 5  |
| 5  | RCHP-DBM | MAM     | 400  | 3/1   | 15 | None          | dust              | huge chips                        | 500 milled | yes    | 1  |
| 6  | RCHP-DBM | MAM     | 600  | 3/1   | 15 | None          | dust              | large chips                       | 125 milled | no     | 1  |
| 7  | RCHP-DBM | HMAM    | 400  | 3/1   | 20 | None          | small shavings    | very small chips                  | 125 milled | no     | 5  |
| 8  | RCHP-DBM | MAM/NVP | 600  | 2/1   | 15 | None          | small shavings    | moderate chips                    | 500 milled | yes    | 3  |
| 9  | RCHP-DBM | MAM/NVP | 1000 | 3/3/2 | 15 | None          | dust              | moderate chips                    | 500 milled | yes    | 1  |
| 10 | RCHP-DBM | MAM/NVP | 1000 | 1/1/1 | 15 | None          | mostly dust       | moderate chips                    | 63 milled  | yes    | 3  |
| 11 | RCHP-DBM | MAM     | 1000 | 3/1   | 15 | 10% glycerine | mostly dust       | small chips                       | 32 ground  | no     | 7  |
| 12 | RCHP-DBM | MAM     | 1000 | 3/1   | 15 | 20% glycerine | small shavings    | no chips                          | 8 ground   | no     | 10 |
| 13 | RCHP-DBM | MAM     | 1000 | 3/1   | 15 | 20% PEG400    | small shavings    | no chips                          | 8 ground   | no     | 10 |
| 14 | RCHP-DBM | MAM     | 1000 | 3/1   | 15 | 20% Tween®80  | small shavings    | no chips                          | 8 ground   | no     | 10 |
| 16 | SN-E05   | MAM     | 1000 | 3/1   | 15 | 20% Tween®80  | large shavings    | plastic deformation               |            |        |    |
| 17 | RCHP-DBM | MAM     | 1000 | 3/1   | 15 | 15% Tween®80  | small shavings    | no chips                          | 8 ground   | no     | 10 |
| 19 | RCHP-DBM | MAM     | 1000 | 3/1   | 20 | None          | Dust & some small shavings | small chips & distortions | 8 ground   | no     | 9  |
| 20 | RCHP-DBM | HMAM    | 1000 | 3/1   | 15 | None          | Dust & some small shavings | minor distortions     | 63 milled  | slight | 7  |
| 21 | Denka-9S | HMAM    | 1000 | 3/1   | 20 | 15% glycerine | large shavings    | plastic deformation               | 32 ground  | no     | 8  |
|    |          |         |      |       |    |               |                   |                                   | 63 milled  | no     | 9  |

GELCASTING COMPOSITIONS HAVING IMPROVED DRYING CHARACTERISTICS AND MACHINABILITY

This is a divisional of application Ser. No. 08/931,255 filed Sep. 16, 1997 now abandoned.

This invention was made with government support under contract DE-AC05- 96OR22464, awarded by the United States Department of Energy to Lockheed Martin Energy Research Corporation, and the United States Government has certain rights in this invention.

FIELD OF THE INVENTION

This invention relates generally to gelcasting compositions, and more particularly to gelcasting compositions with improved drying and storage characteristics, and improved machinability in the dried state.

BACKGROUND OF THE INVENTION

Gelcast ceramic bodies have been demonstrated to be machinable in the "green" state, after drying and before firing. See S. D. Nunn, O. O. Omatete, C. A. Walls, and D. L. Barker, "Tensile Strength of Dried Gelcast Green Bodies," Ceram. Eng. Sci. Proc., 15 [4] 493–498 (1994), and S. D. Nunn and G. H. Kirby, "Green Machining of Gelcast Ceramic Materials," Ceram. Eng. Sci. Proc., 17 [3–4] (1996).

Polymers have been demonstrated to have utility in methods of forming complex or intricately shaped parts from ceramic powders. The forming of ceramics is important because machining ceramics into complex shapes is time consuming and expensive, and in many cases impractical. Strivens, U.S. Pat. No. 2,939,199, discloses a method of forming articles from ceramic powders wherein the ceramic powders are mixed with a vehicle comprising a thermosetting material and a plasticizer, and the resultant mixture is injection molded into a mold of a desired shape and heated to cure the thermosetting component. The vehicle is then removed from the molded part by low pressure distillation or by solvent extraction. Kingery et al., U.S. Pat. No. 3,351,688, discloses a method wherein the ceramic powder is mixed with a binder such as paraffin at a temperature where the binder is liquid, and the resulting mixture is cast into a mold of the desired shape. The binder is permitted to solidify so that a green piece is formed having a uniform density. Curry, U.S. Pat. No. 4,011,291, and Ohnsorg, U.S. Pat. No. 4,144,297, disclose the use of a paraffin wax binder for molding ceramic powders into desired shapes. Rivers, U.S. Pat. No. 4,113,480, and Wiech, Jr., U.S. Pat. No. 4,197,118, disclose methods for molding parts from metal powders by mixing the powders with binder materials and injection molding the resultant mixtures. Additional methods which employ binder materials are disclosed by Hurther et al., U.S. Pat. No. 4,478,790, and Kato, U.S. Pat. No. 4,460,527.

It is known that gelcasting can also be a useful way of forming ceramic materials. Gelcasting is a method of molding ceramic powders into green products wherein a monomer solution is used as a binder vehicle and the controlled polymerization of the monomer in solution serves as a setting mechanism. The resulting green product is of exceptionally high strength and may be dried to remove water. After drying, the product may be further heated to remove the polymer and may also subsequently be fired to sinter the product to a high density. Gelcasting methods are disclosed in Janney, U.S. Pat. No. 4,894,194, Janney et al, U.S. Pat. No. 5,028,362, and Janney et al., U.S. Pat. No. 5,145,908.

Gelcasting of ceramics such as alumina is described by A. C. Young, O. O. Omatete, M. A. Janney, and P. A. Menchhofer, "Gelcasting of Alumina," J. Am. Ceram. Soc., 74 [3] 612–18 (1991). Mark A. Janney, Weiju Ren, Glen H. Kirby, Stephen D. Nunn, and Srinath Viswanathan, "Gelcast Tooling: Net Shape Casting and Green Machining," Materials and Manufacturing Processes, 1997 describe the use of a water-based gelcasting system to form parts using H13 tool steel powder. R. Raman, M. A. Janney, and S. Sastri, "An Innovative Processing Approach to Fabricating Fully Dense, Near-Net-Shape Advanced Material Parts," Advances in Powder Metallurgy and Particulate Materials, 1996, Metals Powder Industries Federation, Princeton, N.J., 1996 describe the use of a water-based gelcasting system to form parts using an 83/17 aluminum/silicon alloy powder. S. D. Nunn, J. O. Kiggans, Jr., R. E. Simpson, II, and J-P Maria, "Gelcasting of Silicon Compositions for SRBSN," Ceram. trans., 62, 255–62 (1996) describe the use of an alcohol-based gelcasting system and a water-based gelcasting system to form parts using silicon powder. M. A. Janney, "Gelcasting Superalloy Powders," in P/M in Aerospace, Defense and Demanding Applications—1995, Metals Powder Industries Federation, Princeton, N.J., 1995, describes the use of a water-based gelcasting system to form parts. The disclosures of these references are incorporated fully by reference.

It has recently been observed that the machinability of gelcast blanks is sensitive to the ambient humidity. Parts that are stored in high humidity conditions machine well, while those that are stored in low humidity conditions machine poorly. Poor machining characteristics are evidenced by increased chipping and tool chatter, with a poor surface finish for equivalent machining conditions. It has further been observed that green parts that have been stored for extended periods of time at ambient conditions develop cracks that make them unusable.

The gelcasting of parts having a large cross sectional thickness presents particular problems. These parts can be cast and gelled, however, they are difficult to dry without introducing cracks that prevent further processing, such as firing and densification. It accordingly would be desirable to provide gelcasting compositions which would not be as sensitive to humidity conditions, would machine well, with relatively less chipping and tool chatter, and would result in an improved surface finish for equivalent machining conditions. It would further be desirable that the parts be capable of storage for extended periods of time in ambient conditions without the development of cracks. It further would be desirable to provide gelcasting compositions which would permit the manufacture of gelcast parts having large cross-sectional thicknesses which can be dried without introducing cracks.

SUMMARY OF THE INVENTION

It is an object of the invention to provide gelcasting compositions which have improved drying characteristics and machinability.

It is another object of the invention to provide gelcasting compositions which result in gelcast blanks which are less sensitive to changes in the ambient humidity.

It is yet another object of the invention to provide gelcasting compositions which result in gelcast blanks which, after storage in low humidity conditions, machine relatively well, with relatively less chipping and tool chatter, and after machining result in products having an improved surface finish. It is still another object of the invention to provide gelcasting compositions which can be stored for extended periods of time in ambient conditions without the development of cracks. It is another object of the invention to provide gelcasting compositions which can produce gelcast parts having large cross-sectional thicknesses, and which can be dried without introducing cracks that will prevent further processing such as firing and densification.

These and other objects are provided by a gelcasting formulation comprising an inorganic powder, solvent, a monomer system soluble in said solvent, an initiator system for polymerizing said monomer system, and a plasticizer soluble in the solvent. Dispersants and other processing aides to control flow properties during casting can also be included. Additives known in the art to modify gelcast properties can also be included. The plasticizer improves the mechanical properties of the gelcast part after polymerization. Parts cast with gelcasting formulations according to the invention demonstrate improved drying behavior, machinability, and shelf-life in the dried and unfired state.

The functional group of the monomers is preferably selected from vinyl and allyl groups. The monomer system preferably comprises at least one multifunctional monomer (di, tri, etc.). In a most preferred embodiment, the monomer system comprises at least one monofunctional monomer and at least one difunctional monomer. Aqueous solutions of hydroxymethacrylamide (HMAM) with optional comonomers, can also be utilized for the monomer system.

A method for forming inorganic powders according to the invention includes the steps of making a slurry mixture comprising inorganic powder, solvent, a monomer soluble in the solvent, a polymerization initiator system, and a plasticizer soluble in the solvent. Dispersants and other processing aides to control slurry flow properties can also be included. The slurry mixture is cast, formed, or shaped into a desired configuration. The monomers are then reacted to polymerize into a firm polymer-solvent gel matrix. The mixture is thereby formed into a solid product.

The solid product so formed can be further processed at a temperature and pressure and for a time sufficient to substantially remove the solvent from the solid product. An additional step can be performed after the removal of the solvent whereby the solid product is treated at a temperature and for a time sufficient to substantially remove the polymer and plasticizer from the solid product. Finally, after the polymer-removal step, the solid product can be thermally processed at a temperature sufficient to substantially permanently bond the inorganic particles together.

BRIEF DESCRIPTION OF THE DRAWINGS

The sole drawing FIGURE is a table summarizing green machining for gelcast systems.

DETAILED DESCRIPTION OF THE PREFERRED EMBODIMENTS

The invention provides a gelcasting formulation comprising an inorganic powder, solvent, a monomer system soluble in the solvent, an initiator system for polymerizing the monomer system, and a plasticizer soluble in the solvent. The plasticizer improves the mechanical properties of the system after polymerization.

The invention provides a method for molding inorganic powders into solid, shaped products. The invention also has applications in both ceramic and metallic systems such as alumina, hydroxylapatite, zirconia, silicon nitride, silicon carbide, steels, nickel alloys, cobalt alloys, chrome alloys, tungsten alloys, molybdenum alloys, titanium alloys, zirconium alloys, and aluminum alloys. Mixtures of inorganic powders are also possible. Ceramic powders suitable for use in the present invention include, but are not limited to, alumina, silica, magnesia, zirconia, spinels, mullite, glass frits, tungsten carbide, silicon carbide, boron nitride, silicon nitride, ferrites, titanates, chromium oxide, iron oxide, zinc oxide, indium-tin oxide, clays, refractory carbides (such as TiC, TaC, and the like), refractory nitrides (such as TiN, TaN, WN, and the like), and refractory borides (such as $TiB_2$, $ZrB_2$ and the like). The inorganic powder is typically mixed with a dispersant for the powder and a monomer solution to form a slurry mixture. The monomer solution provides a low viscosity vehicle for the inorganic powder. Additionally, when heated, the monomer solution polymerizes and cross-links to form a firm, strong polymer/solvent gel matrix. The gel matrix immobilizes the inorganic powder in the desired shape of the mold in which the slurry mixture is heated.

The monomer solution which is mixed with the inorganic powder to form the slurry mixture includes at least one multifunctional monomer. The monomer solution preferably comprises at least one monofunctional monomer and at least one multifunctional monomer. Mixtures of monomers are also possible.

Examples of suitable monofunctional monomers include alkyl acrylamides (such as ethyl acrylamide and propyl acrylamide), alkyl acrylates (such as methyl acrylate, ethyl acrylate, and butyl acrylate), alkyl methacrylates (such as methyl methacrylate, ethyl methacrylate, and butyl methacrylate), acrylamide, acrylic acid (AA), acrylonitrile, alkoxy alkyl acrylates (such as methoxy methyl acrylate, and methoxy ethyl acrylate), alkoxy alkyl methacrylates (such as methoxy methyl methacrylate and methoxy ethyl methacrylate), butadiene, hydroxyalkyl acrylates (such as hydroxyethyl acrylate and hydroxypropyl acrylate), hydroxyalkyl methacrylates (such as hydroxyethyl methacrylate (HEMA) and hydroxypropyl methacrylate (HPMA)), hydroxymethylacrylamide (HMAM), isoprene, methacrylamide (MAM), methacrylic acid (MAA), methoxy polyethyleneglycol methacrylate (MPEGMA), methyl styrene, n-vinyl pyrrollidone (NVP), styrene, vinyl acetate, and mixtures thereof. Generally, the multifunctional monomer includes at least two functional groups, for example, vinyl or allyl groups. Examples of suitable multifunctional monomers include allyl methacrylate, butylene glycol diacrylate, butylene glycol dimethacrylate, diethylene glycol diacrylate, diethylene glycol dimethacrylate, ethylene glycol diacrylate, ethylene glycol dimethacrylate, ethoxylated trimethylolpropane triacrylate, ethoxylated trimethylolpropane trimethacrylate, hexanediol diacrylate, hexanediol dimethacrylate, N, N'-methylene bisacrylamide (MBAM), and poly(ethylene glycol) dimethacrylate (PEGDMA), tetraethylene glycol diacrylate, tetraethyleneglycol dimethacrylate, trimethylolpropane triacrylate, trimethylolpropane trimethacrylate, tripropylene glycol diacrylate, and tripropylene glycol dimethacrylate.

The solvent system that is used can be selected from water, alcohols, glycol ethers, ketones, hydrocarbons and chlorinated hydrocarbons, and mixtures thereof.

The plasticizer that is utilized should be soluble in the solvent and capable of improving the mechanical properties of the system after polymerization. The plasticizers that are useful in the invention can be selected from any of several known plasticizers. These are compounds which increase the flexibility, workability, or extensibility of a plastic material. A plasticizer may also reduce the melt viscosity, lower the temperature of a second order transition, or lower the elastic modulus of a plastic. See *Plastics, Additives and Modifiers Handbook*, Van Nostrand Reinhold, New York, 1992, and *Plastics Additives Handbook*, 4th Edition, R. Gatcher and H. Muller, Hanser/Gardner Publications, Inc., Cincinnati (1993), the disclosures of which are incorporated fully by reference. The plasticizer should not inhibit gelling of the gelcasting system. The plasticizer may also decrease the glass transition temperature, and will usually provide lubrication to the material.

Suitable plasticizers for use in the invention include alcohol-ethylene oxide adducts, alcohol-propylene oxide adducts, aliphatic diesters, alkyl alkylether diesters, alkylether monoesters, alkyl monoesters, alkyl phosphate esters, aromatic diesters, aromatic phosphate esters, aromatic sulfonamides, aromatic triesters, aromatic oils, chlorinated hydrocarbons, dialkylether aromatic esters, dialkylether diesters, dioxolane, epoxidized esters, epoxidized oils, ethanolamines, ethanol acetamide, ethanol formamide, ethoxylated fatty acid derivatives, ethylene glycols (including di- to nonaethylene glycol), fatty acid derivatives of sorbitol and ethylene oxide, fatty acid derivatives of sorbitol and propylene oxide, fatty acid esters, glycerol, glycols, hydroxypropyl sucrose, naphthenic oils, polyester resins, poly (ethylene glycol), polyglycol diesters, polyglycols, poly (propylene glycol), polymeric polyesters, propoxylated fatty acid derivatives, propylene glycol, sorbitan monooleate-ethylene oxide adduct, sorbitol, triethanolamine, and mixtures thereof. Specific plasticizers that have been found to have utility with the invention include polyethylene glycol (PEG), glycerin, Tween 80® (Tween 80® is a trademark of ICI Specialities, Wilmington, Del. for their brand of polyoxyethylene (2) sorbitan monooleate).

As an example of the range of materials from which a plasticizer can be selected, we include herein a list of classes of plasticizers from one manufacturer, the CP Hall Co., Chicago, Ill. Within each class listed below, CP Hall supplies from one to twenty individual plasticizers.

| Plasticizer Class | C.P. Hall Plasticizer |
| --- | --- |
| Aromatic Sulfonamides | PlastHall BSA |
| Aromatic Phosphate Esters | Reofos 50, 65, 3600, Kronitex TCP, TXP |
| Alkyl Phosphate Esters | Kronitex TBP, TOF, KP-140 |
| Dialkylether Aromatic Esters | PlastHall 200 (DBEP) |
| Dialkylether Diesters | PlastHall 7050 |
| Polymeric Polyesters | Paraplex G-25, G-31, G-40, G-41, G-50, G-51, G-54, G-56, G-57, G-59, PlastHall HA7A, P-550, P-612, P-622, P-643, P-645, P-650, P-670, P-675, P-900, P-1070, P-7035, P-7035M, P-7046, P-7068, P-7092, P-7092D |
| Polyglycol Diesters | PlastHall 4141, TegMeR, 803, 804, 804 Special, 809 |
| Polyester Resins | Paraplex 5B, RGA-2, RGA-7, RGA-8, GA-20 |
| Alkyl Alkylether Diesters | PlastHall 7006, 83SS, 201 (DBEG), 203 (DBEA), 224 (DBEEG), 226 (DBEEA), 7041, 7045 |
| Aromatic Diesters | PlastHall DOP, DIOP, DBP, DINP, DEP, BOP, DTDP, DOTP, DIDP-E, 6-10P |
| Aromatic Triesters | PlastHall TOTM, TIOTM, TOTM-E, 8-10TM-E |
| Aliphatic Diesters | Monoplex DDA, DIOA, DOA, DOS, NODA, PlastHall DOA, DIBA, DIDA, DINA, DIOA, DTOA, NODA, DIDG, DOZ, DBS, DOS, DOSS, DIODD, DODD, TXIB |
| Epoxidized Esters | Monoplex S-73, S-75 |
| Epoxidized Oils | Paraplex G-60, G-62, PlastHall ESO |
| Chlorinated Hydrocarbons | Paroil 140, Chloroflo 42 |
| Aromatic Oils | Paraflux 2015 |
| Alkylether Monoesters | PlastHall 325 |
| Naphthenic Oils | Process Oil C-255E |
| Alkyl Monoesters | PlastHall R-9, 100, 503, C-895, 914, 7049, 7059 |

The initiator system can be selected from any suitable initiator system. Suitable initiators are selected from the group which will polymerize the particular monomer system at hand, and are soluble in the solvent. It is well established that vinyl monomers can be polymerized to high molecular weight by three primary means: free radical initiation, anionic initiation, and cationic initiation. Table 1 indicates the general applicability of the three methods. The table shows that not all polymerizations can be initiated by all three types of initiators, but that particular monomers will be better initiated by particular types of initiators. The selection of a particular initiator system for a particular monomer system will be best determined through experimental trials.

TABLE 1

General applicability of polymerization methods to some vinyl monomers.

| | | Polymerization method | | |
| --- | --- | --- | --- | --- |
| Monomer | Structure | Cationic | Free Radical | Anionic |
| Isobutene | $CH_2=C(CH_3)_2$ | Yes | No | No |
| Vinyl ethers | $CH_2=CHOR$ | Yes | No | No |
| Ethylene | $CH_2=CH_2$ | Yes | Yes | No |
| Vinyl esters | $CH_2=CHOCOR$ | No | Yes | No |
| Vinyl halides | $CH_2=CHX$ | No | Yes | No |
| Acrylic esters | $CH_2=CHCOOR$ | No | Yes | Yes |
| Acrylonitrile | $CH_2=CHCN$ | No | Yes | Yes |
| Vinylidene halides | $CH_2=CX_2$ | No | Yes | Yes |
| 1-Nitro-1-alkynes | $CH_2=CRNO_2$ | No | No | Yes |
| Vinylidene cyanide | $CH_2=C(CN)_2$ | No | No | Yes |
| Styrene | $CH_2=CHC_6H_6$ | Yes | Yes | Yes |

Free-radical polymerization is particularly well suited for polymerizations that are used in gelcasting. The initiator system preferably comprises one or more free radical initiators. The initiator system can also be activated by heating. A free radical initiator system is activated by radiation such as IR, visible, UV, X-ray, gamma ray, electron beam or other forms of radiation. The heat can be introduced using microwave heating. Suitable free radical initiators include from ammonium persulfate; ammonium persulfate and tetramethylethylenediamine mixtures (TEMED); sodium persulfate; sodium persulfate tetramethylethylenediamine mixtures; potassium persulfate; potassium persulfate and tetramethylethylenediamine mixtures; azobis [2-(2-iamidazolin-2-yl)propane]HCl (AZIP); azobis (2-amidinopropane) HCl (AZAP); 4,4'-azo-bis-4-cyanopentanoic acid; azobisisobutyramide; azobisisobutyramidine.2HCl; 2-2'-azo-bis-2 (methylcarboxy)propane; N,N,N',N'-tetramethylethylenediamine (TEMED), persulfates with or without TEMED, azobis isobutyronitrile (ABIN), and other organic azo and peroxide compounds including diacyl peroxides (such as benzoyl peroxide), ketone peroxides (such as 2,4-pentane dione peroxide), peroxydicarbonates (such as di (n-propyl) peroxydicarbonate), peroxyesters (such as t-butylperoxy neodecanoate), dialkyl peroxides (e.g, dicumyl peroxide), organosulfonyl peroxides (such as acetyl cyclohexylsulfonyl peroxide), hydroperoxides (such as t-butyl hydroperoxide), peroxyketals (such as 1,1,-di (t-butylperoxy) 3,3,5-trimethyl cyclohexane), Luazo initiators (such as 2-t-butylazo 2-cyanopropane), and azo compounds (such as azobis isobutyronitrile, azobis ethylpropionitrile, azobis methylbutyronitrile), and photoinitiators such as 2-hydroxy-1-[4-(hydroxyethoxy) phenyl]-2-methyl-1-propanone, 2-hydroxy-2-methyl-1-phenyl-1-propanone, benzoin ethers, hydroxy alkyl phenyl acetophenones, dialkoxy acetophenones, phosphine oxime derivatives, amino ketones, halogeno acetophenones, aryl aryl sulfides, and alkylphenone-containing peroxides.

The free-radical initiator is generally inactive at ambient temperatures so that the shelf-life of the monomer solution is relatively long. However, once the slurry mixture containing the monomer solution is heated, the reaction rate of the initiator compound is relatively high, polymerization and cross-linking of the monomers is easily and quickly achieved. The amount of initiator included in the monomer is generally small as compared with the amount of monomer in accordance with conventional polymerization methods.

Table 2 summarizes selected gelcasting systems, including solvent, monofunctional monomer, multifunctional monomer, initiator and plasticizer that are useful for the invention. A given gelcasting system would include a selected solvent and the following: zero, one, or more monofunctional monomers; one or more multifunctional monomers; one or more initiators; and one or more plasticizers. In addition, one can use a solvent blend (e.g., an alcohol and a ketone) as the solvent of choice so long as the monomers, initiators, and plasticizers are mutually soluble. Additional additives known to those skilled in the arts of ceramic processing may also be present, such as dispersants, lubricants, flocculants, suspending agents, foam control agents, and the like.

TABLE 2

Compositional variables for gelcasting formulations containing plasticizers

| Solvent | Monofunctional Monomer | Multifunctional Monomer | Initiator | Plasticizers |
|---|---|---|---|---|
| Water | HMAM | PEGDMA | APS | polyethylene glycols |
|  | MAM | MBAM | APS/TEMED | polypropylene glycols |
|  | NVP | N,N'-(1,2-dihydroxyethylene) bisacrylamide | Other persulfates w/ or w/o TEMED | Glycerine |
|  | MPEGMA |  | AZIP | Sorbitan monooleate-ethylene oxide adduct. |
|  | AA, MAA hydroxy alkyl acrylates; hydroxt alkyl-methacrylates alkyl acrylamides; alkyl-methacrylamides |  | AZAP Other water-soluble azo compounds | Ethylene oxide adducts Propylene oxide adducts |
| Alcohol | MAM | PEGDMA | AZIP | polyethylene glycols |
|  | NVP | MBAM | AZAP | polypropylene glycols |
|  | MPEGMA | N,N'-(1,2-dihydroxyethylene) bisacrylamide | AIBN | Glycerine |
|  | AA, MAA | Alkyl diacrylates Alkyl dimethacrylates | Other organic azo and peroxide compounds | Various polymeric and fatty acid derivative plasticizers. |
|  | Hydroxy alkyl acrylates; Hydroxy alkyl-methacrylates alkyl acrylamides; alkyl-methacrylamides alkyl acrylamides; alkyl-methacrylamides |  |  | Ethylene oxide adducts Propylene oxide adducts |

TABLE 2-continued

Compositional variables for gelcasting formulations containing plasticizers

| Solvent | Monofunctional Monomer | Multifunctional Monomer | Initiator | Plasticizers |
|---|---|---|---|---|
| Glycol ethers | MAM<br>NVP | PEGDMA<br>MBAM | AIBN<br>Other organic azo and peroxide compounds | polyethylene glycols<br>polypropylene glycols |
| | MPEGMA | N,N'-(1,2-dihydroxyethylene) bisacrylamide | | Glycerine |
| | AA | Alkyl diacrylates<br>Alkyl dimethacrylates | | Various polymeric and fatty acid derivatives used in the polymers industry. |
| | MAA | Multifunctional acrylates | | Ethylene oxide adducts |
| | HEMA | | | Propylene oxide adducts |
| | HPMA<br>Styrene<br>Acrylate esters<br>Methacrytate esters | | | |
| Ketones | MAM<br>NVP | PEGDMA<br>MBAM | AIBN<br>Other organic azo and peroxide compounds | polyethylene glycols<br>polypropylene glycols |
| | Hydroxyalkylacrylates<br>Hydroxyalkylmethacrylates | Alkyl diacrylates<br>Alkyl dimethacrylates | | Glycerine |
| | Acrylate esters\<br>Methacrylate esters | Multifunctional acrylates | | Various polymeric and fatty acid derivatives used in the polymers industry. |
| | Styrene | | | Ethylene oxide adducts<br>Propylene oxide adducts |
| Hydrocarbons and chlorinated hydrocarbons | NVP | PEGDMA | Organic azo and peroxide compounds | Various polymeric and fatty acid derivatives used in the polymers industry. |
| | Styrene<br>Acrylate esters | MBAM<br>Alkyl diacrylates<br>Alkyl dimethacrylates | | |
| | Methacrytate esters | Multifunctional acrylates | | |

AA = acrylic acid
AIBN = azobis isobutyronitrile
APS = ammonium persulfate aqueous solution
AZAP = azobis (2-amidinopropane) HCl
AZIP = azobis [2-(2-imidazolin-2-yl) propane] HCl
HMAM = hydroxymethylacrylamide
MAA = methacrylic acid
MPEGMA = methoxy polyethyleneglycol methacrylate
NVP = n-vinyl pyrrollidone
PEGDMA = polyethyleneglycol dimethacrylate
TEMED = tetramethylethylenediamine (TEMED)

Various dispersants for ceramic powders are known in the art and are appropriate for use in the present invention. Care should be exercised, however, in order to select a dispersant which does not interact with the components of the monomer solution, particularly the initiator. A particular dispersant may be evaluated for suitability with a particular ceramic powder and a particular monomer solution by mixing small amounts of the respective components and judging the flow properties of the resultant mixture, whether the resultant mixture exhibits a notable yield point, and/or whether the mixture is dilatant. Preferred dispersants in water include acrylic and methacrylic acid salts.

The ceramic powder, the monomer solution and the plasticizer may be combined in any suitable manner. In a preferred embodiment, the slurry mixture is formed by dissolving the dispersant and the plasticizer in the monomer solution then adding the ceramic powder to the solution. The resultant slurry mixture is formed into a desired shape and heated for a temperature and for a time sufficient for the monomers to polymerize and cross-link to form a firm polymer-solvent gel matrix. The exact temperature at which the polymerization and cross-linking occurs depends on the particular initiator compound, and the particular monomers which are included in the monomer solution. The polymerization reaction is preferably accomplished at temperatures between the freezing point and the boiling point of the solvent system being used. For practical processing reasons, temperatures between about 15° C. and 100° C. are preferred. Similarly, the gel time necessary to form a firm polymer solvent gel matrix is dependent on the particular monomers, solvent and initiator compound. Generally, the slurry mixture should be heated for at least 1 minute, and preferably is heated for a period of from about 1 to about 120 minutes in order to polymerize and cross-link the monomers and form the firm polymer-solvent gel matrix. The gel can be formed under vacuum, or at pressures greater than atmospheric, and as high as about 300 psi.

After heating, the resultant shaped, solid product may be cooled to ambient temperature. The product is in a wet, green condition in that it contains solvent and it is in the unsintered form.

The green product may subsequently be heated in order to substantially remove the organic solvent to provide a dry product. Although the specific temperature and time necessary for drying the product depends on the specific inorganic powder, monomer, and solvent employed. The most important consideration will be the range of temperatures defined by the melting and boiling points of the solvent being used. Initially, drying should be conducted at a temperature such that evaporation is not too rapid. Consequently, the drying temperature will typically be closer to the melting point than to the boiling point of the solvent. As the drying process proceeds, the temperature may be raised to provide faster drying rates. Finally, to drive off the last traces of solvent from the gelcast part may require temperatures in excess of the boiling point for the particular solvent. In general, drying will require times of at least one hour and may require times up to 30 hours. Additionally, the polymer may be substantially removed from the product by further heating at a higher temperature, for example, greater than about 500° C. Finally, the solid, shaped product may be sintered to form a high density body. Sintering temperatures for various ceramic powders are well known in the art. Alternatively, substantial removal of the polymer may be accomplished at a low temperature step of the sintering process.

Other ingredients may be added to the gel in addition to the plasticizers. These other ingredients can serve to impart additional properties to the final gelcast composition. Examples include electrolytes, bactericides, fungicides, soluble functional polymers, inorganic particles or fibers, organic particles or fibers, foaming and blowing agents, gasses, defoamers, and emulsifiers.

It is when the product of the invention is in the green and dried gelcast state that the benefits of the invention are most apparent. Compositions according to the invention evidence improved machinability and a reduction in edge and corner chipping, and improved surface finish and resultant reduced friction of the tool bit when machining. Green machining is greatly enhanced by the addition of the plasticizer.

The addition of the plasticizer also results in better shelf life for dried, green gelcast parts. There is improved machinability in the green state, reduced sensitivity to variations in humidity during storage, and improved drying behavior for large cross-section parts. The plasticizer makes the gel less sensitive to ambient humidity conditions, and reduces the brittleness of the gel, which allows thicker parts to be dried without introducing excessive stresses that lead to cracking.

Gelcasting systems are comprised of several ingredients including but not limited to the following: a solid phase consisting of insoluble particles or mixtures thereof of ceramic or metal powder, and a liquid phase in which all the ingredients are either soluble or emulsifiable, which might include solvents, monomers, dispersants, flocculants, suspending agents, plasticizers and foam control agents.

The compositional ranges given below are based on the total weight or volume of the gelcasting system unless specifically called out otherwise (e.g., amount of dispersant).

The ceramic or metal powder is typically incorporated at a volume fraction solids in the range of 10 to 80 vol %. The very wide range of solids loading useful in gelcasting is directly dependent on the nature of the ceramic or metal powder one is using. For example, a very low solids loading (on the order of 10 vol %) is achievable if one chooses to gelcast a fumed silica powder. These powders have extremely high surface area, extremely small particle size, and do not pack very efficiently. For such a powder, a flowable suspension can be achieved only at a low solids loading. At the opposite extreme is the case of refractory ceramic mixes, in which the particle size of the mix ranges broadly from several micrometers to several millimeters. Flowable suspensions can be made in such a system at solids loadings as high as 80 vol % solids, or even higher in some cases. Many of the common ceramics (e.g. whitewares, alumina, mullite, zirconia, silicon nitride, silicon carbide) can often be used in a middle range of solids loading, i.e., between about 40 and 65 vol % solids.

Solvents typically make up about 20 to 90 volume % of the gelcasting suspension. The most common solvent that is useful for gelcasting is water. This is due to its availability and its low health, environmental, and safety impacts. However, gelcasting systems have been developed using a wide range of solvents from hydrocarbons to ketones, glycol ethers, and alcohols, and blends of two or more of these. The primary concerns relative to selection of a solvent are: its compatibility with the monomer systems chosen (see below); its evaporation rate and boiling point which influences the time required to dry the gelled articles; any health, safety or environmental concerns; and, its interaction with the ceramic or metal powder. This final consideration is especially of concern when dealing with reactive metal or ceramic powders. For example, aluminum nitride is well know to react rapidly with water to form aluminum hydroxide and ammonia, which is detrimental to the final aluminum nitride part. This reaction can be avoided if the gelcasting system is based on a non-aqueous solvent such as an alcohol or a glycol ether.

Gelcasting monomers are typically vinyl or allyl functional. They make up about 1 to 10 weight % of the total gelcast slurry. (However, most gelcasting systems are formulated on the basis of the monomer concentration in the solvent phase—that is, the liquid phase of the suspension. From that perspective, the monomer typically comprises from 5 to 40 wt % of the solvent phase.) Monomers may be monofunctional or they may be multifunctional (di-, tri-, tetra-, etc.). Gels can be formed using a single monomer in some cases, especially if the monomer has more than one vinyl or allyl bond that can polymerize. An example of such a system would be poly (ethylene glycol) dimethacrylate in water or in isopropyl alcohol. In many cases, more than one monomer is used to form a gel in a particular system. In those cases, there is often a monofunctional vinyl monomer and a di- or tri-functional vinyl monomer used. The monofunctional monomer is a chain builder and the di-or tri-functional monomer is a chain brancher. More than one monofunctional monomer can be used. More than one di-or tri-functional vinyl monomers can be used. Monomers are selected for a particular gelcasting system based on several properties. They should be soluble in the solvent of choice. They should form a gel in that solvent. The gel should be stable with time; that is, there should be minimal syneresis of the liquid from the gel after the gel is formed.

Dispersants, flocculants, and suspending agents are added to gelcasting suspensions to control the flow behavior of the suspension. Dispersants make the suspension flow more readily; flocculants make the suspension flow less readily; suspending agents prevent particles from settling out of suspension. These additives are typically incorporated at about 0.01 to 10 wt % of the ceramic or metal powder in the suspension. Suitable dispersants include alcohol-ethylene oxide adducts, alcohol-propylene oxide adducts, ammonium hydroxide, derivatives of oxygenated waxes, fatty acids, fatty acid-ethylene oxide adducts, fatty acid-propylene oxide adducts, fatty amides, fatty amines, fatty acid derivatives of sorbitol and ethylene oxide, fatty acid derivatives of sorbitol and propylene oxide, mineral acids, naphthalene sulfonic acid derivatives, sulfosuccinates, phosphate esters, poly (acrylic acid) and its salts, poly (methacrylic acid) and its salts, polypyrrolidone, poly (ethylene imine), poly (ethylene oxide), poly (acrylamide), poly (alkyl acrylates), and poly (alkyl methacrylates).

Plasticizers are incorporated in the gelcasting suspension to influence the properties of the gel structure in the wet and dried states. Plasticizers are typically incorporated at between 1 and 20 weight % of the monomer weight. Selection of the plasticizer to be used in a particular gelcasting system depends on a variety of factors. First, the plasticizer should be soluble in the solvent system used for gelcasting. Second, it should be compatible with the dry polymer gel. Third, the plasticizer should be effective at reasonable concentrations; plasticizer additions are typically in the range of 1 weight % to 50 weight %, based on the weight of the polymer in the gel, but can extend to 100%. The level of plasticizer used will depend on the plasticizer and the monomers from which the gel is polymerized; the particular level of addition that is best for a given plasticizer—gel system must be determined by experiment. One must also consider what aspect of the plasticizer is most important for a given gelcasting system. For example, adding a plasticizer has been shown to improve drying of gelcast parts, improve green strength of dried gelcast parts, and to improve green machining of dried gelcast parts. A given plasticizer (and level of plasticizer addition) may impart all of these improvements to a particular gelcasting system. However, some plasticizers may be better at improving green strength than they are at improving green machining performance. Therefore, the designer of a gelcasting suspension must take into consideration what attributes he wants to impart into the gelcasting system before selecting a plasticizer. These selections are most often made based on experimental trials.

Foam control agents are added to gelcasting suspensions to either remove bubbles or form bubbles in the suspension. Foam control agents are typically added at from 0.01 to 2 weight % of the suspension. If one is trying to make low density materials, then foaming agents can be added to the gelcasting suspension to form bubbles and thus lower the density of the gelled part. Alternatively, if one is trying to make a high density part, defoamers are added to the suspension to help break up any bubbles that might form. In addition, the suspension might be placed under vacuum to accelerate the removal of bubbles from the suspension.

The following examples are useful in showing the value of the present invention. The following terminology will be referenced in the examples.

TABLE 3

Terminology for green machining evaluation

Turning Morphology

| | |
|---|---|
| dust | Material produced by the cutting head was a fine particulate. |
| large shavings | Material produced by the cutting head looked like pencil shavings; it was thin and curled, with a length on the order of ⅛ to ¼ inch. |
| small shavings | Material produced by the cutting head was similar to the large shavings category, except the length was less than ⅛ inch. |

Edge & Corner Conditions

| | |
|---|---|
| no chips | No chips were visible to the naked eye. |
| very small chips | Chips were about 0.05 inch long |
| small chips | Chips were about 0.1 inch long |
| moderate chips | Chips were about 0.15 inch long |
| large chips | Chips were about 0.2 inch long |
| huge chips | Chips were about 0.25 inch long |
| minor distortions | edge smeared during cutting |
| plastic deformation | edge "buttered" rather than cut |
| small chips & distortions | "buttered" edge with about 0.1 inch chips |

Surface Finish

Surface finish estimates were based on measurements made with an S-22 Microfinish Comparator, GAR Electroforming, Div. of Mite Corp., Danbury, Conn. Estimates range from a worst case "500 milled" finish to a best case "8 ground" finish. The lower the number, the better the surface finish.

EXAMPLE #1

Comparative Gelcasting Composition

This is Cast 1 in FIG. 1, machining characteristics study. A gelcast suspension was made using the following ingredients: the suspension contained 55 vol % solids and used a monomer solution that comprised 15 wt % monomer with the monofunctional and difunctional monomers in a 3 to 1 ratio, by weight. The polymerization reaction was initiated using a standard free radical initiator system of ammonium persulfate (APS) and tetramethylethylenediamine (TEMED).

The batch formulation is given below:

| | | |
|---|---|---|
| Aluminum Oxide | 1000.00 g | Ceramic Powder |
| Water | 167.12 g | Solvent |
| Darvan 821-A (R. T. Vanderbilt Co., Norwalk, CT) | 10.00 g | Dispersant |
| MAM (Methacrylamide) | 22.12 g | Monofunctional monomer |
| PEG(1000)DMA (polyethyleneglycol [1000] dimethacrylate) | 7.37 g | Difunctional monomer |

This suspension was processed by mixing in a ball mill. The mill jar was a 2 liter capacity polyethylene wide mouth bottle; the media used were aluminum oxide ⅜ inch diam. short cylinders at a loading of 500 g media to 1000 g alumina powder.

After mixing, the suspension was removed from the mill and deaired under vacuum. TEMED and APS were added at the rate of 1.0 μl 10% APS solution and 0.1 μl TEMED per gram alumina suspension to initiate the gelation reaction. The suspension was then poured into either 4 inch×4 inch×½ inch or 4 inch×4 inch×1 inch molds and the molds were placed in a 50° C. oven to gel for 30 minutes.

After gelation, the parts were stripped from the molds. The resulting plates were dried at 92% relative humidity and ambient temperature for 2 days followed by drying at 75% relative humidity and ambient temperature for 2 days. After drying, the parts were stored at ambient laboratory conditions. After drying, the parts were fired following standard practice. This consisted of a binder burnout stage (1° C./min to 600° C., hold at 600° C. for 1 hour) followed by a high firing stage (5° C./min to 1550° C., hold at 1550° C. for 1 hour). All firings were conducted in flowing air (approx. 5 SFCH).

This standard formulation yielded consistently good results with the half inch thick cross section plates. No problems were encountered in drying, binder removal, or firing for the ½ inch thick plates. Furthermore, the ½ inch thick plates were stable with respect to storage at ambient laboratory conditions.

However, when this formulation was used to make 1 inch thick plates, serious problems were encountered. When the 1 inch thick parts were sintered they cracked severely. This occurred whether the parts were fired immediately after drying, or if the parts were stored for an extended period of time at ambient conditions before firing. In addition, parts that were stored at ambient conditions developed cracks in the green state. Typically these were hairline cracks through the middle of the plate. This type of crack is indicative of tensile stresses being generated in the part.

EXAMPLE #2

Improved Gelcast Composition with Plasticizer

This is Cast 12 in FIG. 1, machining characteristics study. A gelcasting batch as in Example 1 was used except 20% of the monomer weight was removed from the water and replaced with glycerin. Solids loading remained at 55 vol %.

| Aluminum Oxide | 1000.00 g | Ceramic Powder |
|---|---|---|
| Water | 161.22 g | Solvent |
| Darvan 821-A | 10.00 g | Dispersant |
| MAM (Methacrylamide) | 22.12 g | Monofunctional monomer |
| PEG(1000)DMA (polyethyleneglycol [1000] dimethacrylate) | 7.37 g | Difunctional monomer |
| Glycerin | 5.90 g | Plasticizer |

The milling, vacuum deairing, acceleration, casting, gelling and drying operations were identical to Example #1. A 4×4×1 inch plate survived binder burn out and firing to high density with no center cracking (there was some very minor edge chipping or cracking at the corners.)

EXAMPLE #3

Improved Gelcast Composition—Alternative Plasticizer

This is Cast 13 in FIG. 1, machining characteristics study. The experiment was conducted in the same manner as Example #2 except Polyethylene glycol 400 (PEG 400) was used instead of glycerin as the plasticizer. The solids loading remained the same.

The milling, vacuum deairing, acceleration, casting, gelling and drying operations were identical to Example #1. A 4×4×1 inch plate survived binder burn out and firing to high density with no center cracking and no edge cracking or chipping.

EXAMPLE #4

Improved Gelcast Composition—Use of a Third Plasticizer.

This is Cast 14 in FIG. 1, machining characteristics study. The experiment was conducted in the same manner as Example #2 except sorbitan mono-oleate (TWEEN ®80) was used instead of glycerin as the plasticizer. The solids loading remained the same.

The milling, acceleration, casting, gelling and drying operations were identical to Example #1 (vacuum deairing required the addition of a small quantity of Surfynol 104E (Air Products and Chemicals, Inc., Allentown, Pa.) to mitigate foaming.) A 4×4×1 inch plate survived binder burn out and firing to high density with no center cracking and no edge cracking or chipping.

EXAMPLE #5

A Comparative Gelcasting Composition Using Silicon Nitride Ceramic Powder

A gelcasting suspension was made using ceramic powder, organic monomers, water, and a dispersant. The suspension contained 45 vol. % solids and used a monomer solution that comprised 15 wt % vinyl monomer with the monofunctional and difunctional monomers in a 3 to 1 ratio, by weight. The polymerization reaction was initiated using a standard free radical initiator.

The batch formulation is given below:

| Silicon nitride | 935 g | Ceramic Powder |
|---|---|---|
| Aluminum Oxide | 60 g | Ceramic powder |
| Yttrium Oxide | 79 g | Ceramic Powder |
| Water | 261 g | Solvent |
| Dolapix PC-33 | 24 g | Dispersant |
| MAM (Methacrylamide) | 36.3 g | Monofunctional Monomer |
| PEG(1000)DMA (Polyethylene glycol [1000] dimethacrylate) | 12.1 g | Difunctional Monomer |

This suspension was processed by mixing in a ball mill. The mill jar was a 2 liter capacity polyethylene wide mouth bottle; the milling media used were 10 mm diameter silicon nitride balls at a loading of 1000 g media to 1000 g ceramic powder.

After mixing, the suspension was removed from the mill and deaired under vacuum. Tetramethylethylenediamine (TEMED) and ammonium persulfate (APS) were added at the ratio of 1.0 µl 10 wt. % APS solution and 0.1 µl TEMED per gram ceramic suspension to initiate the gelation reaction. The suspension was then poured into either 4 inch×4 inch×½ inch or 4 inch×4 inch×1 inch molds and the molds were placed in a 50° C. oven to gel for 30 minutes.

After gelation, the parts were stripped from the molds. The resulting plates were dried at 92% relative humidity and ambient temperature for 2 days followed by drying at 75% relative humidity and ambient temperature for two days. After drying the plates were stored at ambient laboratory conditions. The parts were fired following standard practice. This consisted of a binder burnout stage (1° C./min to 600° C., hold at 600° C. for 1 hour) which was conducted in flowing air (approx. 5 SFCH). This was followed by a high firing stage (5° C./min to 1750° C., hold at 1750° C. for 1 hour). High firings were conducted in flowing nitrogen.

The ½ inch thick plates were processed through high firing and produced good material with no cracks. The 1 inch thick parts cracked during the drying; binder burnout and high firing were not conducted with the 1 inch thick samples.

EXAMPLE #6

Improved Gelcasting Composition Using Silicon Nitride Ceramic Powder and a Plasticizer This is Cast #16 in FIG. 1, machining characteristics study. A gelcasting suspension was made as in Example 5 except part of the water was replaced by a plasticizer.

The batch formulation is given below:

| | | |
|---|---|---|
| Silicon nitride | 935 g | Ceramic Powder |
| Aluminum Oxide | 60 g | Ceramic powder |
| Yttrium Oxide | 79 g | Ceramic Powder |
| Water | 251.65 g | Solvent |
| Dolapix PC-33 | 24 g | Dispersant |
| MAM (Methacrylamide) | 36.3 g | Monofunctional Monomer |
| PEG(1000)DMA (Polyethylene glycol [1000] dimethacrylate) | 12.1 g | Difunctional Monomer |
| TWEEN ® 80 | 9.35 g | Plasticizer |

This suspension was processed identically to Example 5.

The 1 inch plate was processed through binder burnout and high firing and produced good material with no cracks.

EXAMPLE #7

Improved Gelcasting Composition Using Silicon Nitride Ceramic Powder and a Second Plasticizer A gelcasting suspension was made as in Example 6 except Tween ®80 was replaced with glycerin as a plasticizer. This suspension was processed identically to Example 5.

The 1 inch plate was processed through binder burnout and high firing and produced good material with no center cracks and only minor edge cracks.

EXAMPLE #8

Improved Gelcasting Composition Using Silicon Nitride Ceramic Powder and a Third Plasticizer A gelcasting suspension was made as in Example 6 except Tween ®80 was replaced with PEG (400) plasticizer. This suspension was processed identically to Example 5.

The 1 inch plate was processed through binder burnout and high firing and produced good material with no center cracks or edge cracks.

EXAMPLE #9

Alcohol-based Gelcasting System

A 40 vol % slurry of silicon nitride powder was dispersed by ball milling in a solution of MAM/PEGDMA (3:1 ratio, 20 wt % in isopropyl alcohol). The slurry was heated to 50° C. for 2 hours to gel the parts.

| Component | Weight (g) | Volume (ml) |
|---|---|---|
| Silicon nitride (E5) | 300.00 | 92.88 |
| PVP 40% in EtOH (dispersant) | | 7.50 |
| isopropyl alcohol monomer solution (20 wt %, 3:1 MAM/PEGDMA) | | 120.54 |
| AIBN 10% soln in IPA (initiator) | | 4.82 |
| Total liquid | | 132.86 |
| Total system volume | | 221.77 |
| Solids loading | | 0.40 |

PVP = polyvinyl pyrrollidone
MAM = methacrylamide
PEGDMA = polyethyleneglycol 1000 dimethacrylate
AIBN = azobis isobutyronitrile

EXAMPLE #10

Propylene Glycol Methyl Ether-based Gelcasting System

A 40 vol % slurry of silicon nitride powder was dispersed by ball milling in a solution of MAM/PEGDMA (3:1 ratio, 20 wt % in propylene glycol methyl ether). The slurry was heated to 60° C. for 1 hour to gel the parts.

| Component | Weight (g) | Volume (ml) |
|---|---|---|
| Silicon nitride (Ceramic powder) | 1000.00 | 309.60 |
| Solsperse 20,000 (Dispersant) | 20.00 | 20.00 |
| Propylene glycol methyl ether monomer solution (20 wt %, 3:1 MAM/PEG1000DMA) | | 427.06 |
| AIBN 10% solution in propylene glycol methyl ether (Initiator) | | 17.51 |
| Total liquid (solvent, monomers, initiator, and dispersant) | | 464.57 |
| Solids loading | | 40 vol % |

Solsperse 20,000 is a product of ICI, Americas, Wilmington, GL.
MAM = methacrylamide
PEGDMA = polyethyleneglycol 1000 dimethacrylate
AIBN = azobis isobutyronitrile Examples of Green Machining The samples containing plasticizer exhibited superior machining characteristics as compared with the unplasticized samples.

The table in FIG. 1 summarizes a green machining study that was conducted on dry gelcast samples. The samples were based on methacrylamide (MAM), n-vinyl pyrrollidone (NVP), or hydroxymethacrylamide (HMAM) as the monofunctional monomer. Polyethyleneglycol 1000 dimethacrylate (PEG-1000-DMA) was the crosslinker for most of the samples; in some cases, lower molecular weight PEGDMA was used (MW=400 or 600). Samples were made using both alumina and silicon nitride. RCHP-DBM is an alumina powder (Malakoff Inds., Inc. Malakoff, Tex.).; SN-E05 (Ube Industries, NY, USA) and Denka-9S (Denka N.Y., USA) are silicon nitride powders. Some of the samples were made with plasticizer (glycerin, PEG400, Tween®80) added to the gelcasting formulation prior to casting and polymerization. The machining process was evaluated in terms of the morphology of turnings produced, the severity of edge and corner chipping, the surface finish produced, and the presence of burn marks caused by excessive friction. In FIG. 1, an overall rating of 1–10 (1=poorest, 10=best) was given to each material based on how the samples performed in machining trials. Plasticized samples were tested in casts 11–21. Acceptable machining performance is shown in bold. The surface finish values were based on measurements using an S-22 Microfinish Comparator, GAR Electroforming, Div. of Mite Corp., Danbury, Conn.; the lower the number, the better the finish.

The samples fell into two distinct groups according to their overall ratings. Samples with a rating of 7 or higher were deemed to be acceptable; samples scoring below 5 were deemed unacceptable. All seven of the samples containing plasticizer scored a 7 rating or above, and four of the samples scored a 10 rating. None of the samples made without plasticizer scored above an 8 rating. The plasticized samples also performed better in terms of surface finish. All seven samples with plasticizer had either good or excellent surface finish. None of the unplasticized samples were good or excellent. Only one of the plasticized samples (#11) showed evidence of edge or corner chipping; this was the lowest plasticizer addition level that we used (10% addition based on the monomer weight). A similar sample containing 20% plasticizer (#12) showed no evidence of chipping. All but one of the unplasticized samples exhibited some degree of edge chipping. None of the plasticized samples exhibited any burn marks, which are the result of excessive heating of the cutting tool. Several of the unplasticized samples showed burn marks.

While casting into a formed mold is preferred is for use in the method of the present invention, other molding techniques, including extrusion molding, or solid free form fabrication may also be employed. Moreover, any conventional additives known in the ceramic processing arts, for example, mold release agents, may be included in the slurry mixtures for their known functions.

This invention may be embodied in other specific forms without departing from the spirit or essential attributes thereof, and accordingly, reference should be had to the following claims, rather than the foregoing specification, as indicating the scope of the invention.

We claim:

1. A method for forming an inorganic powder, said inorganic powder comprising a plurality of inorganic particles, comprising the steps of:
   (a) making a slurry mixture comprising said inorganic powder, a monomer, a polymerization initiator system, a solvent, and a plasticizer, said plasticizer in an amount between approximately 10 wt % and 20 wt % of said monomer, said plasticizer soluble in said solvent;
   (b) forming the slurry mixture into a desired configuration;
   (c) reacting said monomers to polymerize them to form a polymer-solvent gel matrix, wherein said slurry mixture is formed into a solid product, and heating and pressurizing the solid product after said reacting step to remove a portion of the solvent from the solid product, the solid product being crack-free and having a thickness of at least 0.5 inches.

2. The method of claim 1, wherein the solvent is at least one selected from the group consisting of water, alcohols, glycol ethers, ketones and mixtures thereof.

3. The method of claim 1, wherein a monomer in the monomer solution is at least one selected from the group consisting of hydroxymethylacrylamide, methacrylamide, methacrylic acid, methoxy polyethyleneglycol methacrylate, n-vinyl pyrrolidone, N, N'-methylene bisacrylamide, poly(ethylene glycol) dimethacrylate, and mixtures thereof.

4. The method of claim 1, wherein the plasticizer is at least one selected from the group consisting of glycerin, poly (ethylene glycol), poly (propylene glycol), polyoxyethylene (2) sorbitan mono-oleate, and mixtures thereof.

5. The method of claim 1, wherein a polymerization initiator of the polymerization initiator system is at least one selected from the group consisting of ammonium persulfate; ammonium persulfate and tetramethylethylenediamine mixtures; sodium persulfate; sodium persulfate and tetramethylethylenediamine mixtures; potassium persulfate; potassium persulfate and tetramethylethylenediamine mixtures; azobis HCl (AZIP); azobis (2-amidinopropane) HCl (AZAP); azobis isobutyronitrile (AIBN), 2-hydroxy-1-2-methyl-1-propanone; 2-hydroxy-2-methyl-1-phenyl-1-propanone, and mixtures thereof.

6. The method of claim 2, wherein the solvent is water.

7. The method of claim 6, wherein the plasticizer is selected from the group consisting of: glycerin, poly (ethylene glycol), and polyoxyethylene (2) sorbitan mono-oleate.

8. The method of claim 6, wherein said heating and pressurizing step is at a temperature less than 20° C. above the boiling point of the solvent.

9. The method of claim 8, wherein said heating and pressurizing step is at a pressure between 10 millitorr and 100,000 torr.

10. The method of claim 9, wherein said heating and pressurizing step is conducted between 0.1 hour and 100 hours.

11. The method of claim 6, wherein monomers in the monomer solution are methacrylamide and poly(ethylene glycol) dimethacrylate.

12. The method of claim 11, wherein a polymerization initiator of the polymerization initiator system is an ammonium persulfate and tetramethylethylenediamine mixture.

13. The method of claim 12, wherein the plasticizer is at least one selected from the group consisting of glycerin, poly (ethylene glycol), polyoxyethylene (2) sorbitan mono-oleate, and mixtures thereof.

14. A The method of claim 2, wherein the solvent is an alcohol.

15. The method of claim 14, wherein the plasticizer is selected from the group consisting of: glycerin, poly (ethylene glycol), polyoxyethylene (2) sorbitan mono-oleate, and poly (propylene glycol).

16. The method of claim 14, wherein said heating and pressurizing step is at a temperature less than 20° C. above the boiling point of the solvent.

17. The method of claim 16, wherein said heating and pressurizing step is at a pressure between 10 millitorr and 100,000 torr.

18. The method of claim 14, wherein the solvent is isopropyl alcohol.

19. The method of claim 18, wherein monomers in the monomer solution are methacrylamide and poly(ethylene glycol) dimethacrylate.

20. The method of claim 19, wherein a polymerization initiator of the polymerization initiator system is azobis isobutyronitrile.

21. The method of claim 20, wherein the plasticizer is at least one selected from the group consisting of glycerin, poly (ethylene glycol), poly (propylene glycol), polyoxyethylene (2) sorbitan mono-oleate, and mixtures thereof.

22. The method of claim 2, wherein the solvent is a glycol ether.

23. The method of claim 22, wherein the plasticizer is selected from the group consisting of: glycerin, poly (ethylene glycol), polyoxyethylene (2) sorbitan mono-oleate, and poly (propylene glycol).

24. The method of claim 22, wherein said heating and pressurizing step is at a temperature less than 20° C. above the boiling point of the solvent.

25. The method of claim 24, wherein said heating and pressurizing step is at a pressure between 10 millitorr and 100,000 torr.

26. The method of claim 22, wherein the solvent is propylene glycolmethyl ether.

27. The method of claim 26, wherein monomers in the monomer solution are methacrylamide and poly(ethylene glycol) dimethacrylate.

28. The method of claim 27, wherein a polymerization initiator of the polymerization initiator system is azobis isobutyronitrile.

29. The method of claim 28, wherein the plasticizer is at least one selected from the group consisting of glycerin, poly (ethylene glycol), poly (propylene glycol), polyoxyethylene (2) sorbitan mono-oleate, and mixtures thereof.

30. A method for forming an inorganic powder, said inorganic powder comprising a plurality of inorganic particles, comprising the steps of:
(a) making a slurry mixture comprising said inorganic powder, a monomer, a polymerization initiator system, a solvent, and a plasticizer, said plasticizer in an amount between approximately 10 wt % and 20 wt % of said monomer, said plasticizer soluble in said solvent;
(b) forming the slurry mixture into a desired configuration;
(c) reacting said monomers to polymerize them to form a polymer-solvent gel matrix, wherein said slurry mixture is formed into a solid product
(d) heating and pressurizing the solid product after said reacting step to remove a portion of the solvent from the solid product and to retain the plasticizer in the solid product; and,
(e) machining the solid product, the solid product having a machined surface finish less than 63 milled.

31. A method for forming an inorganic powder, said inorganic powder comprising a plurality of inorganic particles, comprising the steps of:
(a) making a slurry mixture comprising said inorganic powder, a monomer, a polymerization initiator system, a solvent, and a plasticizer, said plasticizer in an amount between approximately 10 wt % and 20 wt % of said monomer, said plasticizer soluble in said solvent;
(b) forming the slurry mixture into a desired configuration;
(c) reacting said monomers to polymerize them to form a polymer-solvent gel matrix, wherein said slurry mixture is formed into a solid product, and heating and pressurizing the solid product after said reacting step to remove a portion of the solvent from the solid product and to retain the plasticizer in the solid product, after said heating and pressurizing step, the solid product machinable to a surface finish less than 63 milled.

32. The method of claim 31, wherein the solvent is at least one selected from the group consisting of water, alcohols, glycol ethers, ketones and mixtures thereof.

33. The method of claim 31, wherein a monomer in the monomer solution is at least one selected from the group consisting of hydroxymethylacrylamide, methacrylamide, methacrylic acid, methoxy polyethyleneglycol methacrylate, n-vinyl pyrrolloidone, N, N'-methylene bisacrylamide, poly(ethylene glycol) dimethacrylate, and mixtures thereof.

34. The method of claim 31, wherein the plasticizer is at least one selected from the group consisting of glycerin, poly (ethylene glycol), poly (propylene glycol), polyoxyethylene (2) sorbitan mono-oleate, and mixtures thereof.

35. The method of claim 31, wherein a polymerization initiator of the polymerization initiator system is at least one selected from the group consisting of ammonium persulfate; ammonium persulfate and tetramethylethylenediamine mixtures; sodium persulfate; sodium persulfate and tetramethylethylenediamine mixtures; potassium persulfate; potassium persulfate and tetramethylethylenediamine mixtures; azobis HCl (AZIP); azobis (2-amidinopropane) HCl (AZAP); azobis isobutyronitrile (AIBN), 2-hydroxy-1-2-methyl-1-propanone; 2-hydroxy-2-methyl-1-phenyl-1-propanone, and mixtures thereof.

36. The method of claim 32, wherein the solvent is water.

37. The method of claim 36, wherein the plasticizer is selected from the group consisting of: glycerin, poly (ethylene glycol), and polyoxyethylene (2) sorbitan mono-oleate.

38. The method of claim 36, wherein said heating and pressurizing step is at a temperature less than 20° C. above the boiling point of the solvent.

39. The method of claim 38, wherein said heating and pressurizing step is at a pressure between 10 millitorr and 100,000 torr.

40. The method of claim 39, wherein said heating and pressurizing step is conducted between 0.1 hour and 100 hours.

41. The method of claim 36, wherein monomers in the monomer solution are methacrylamide and poly(ethylene glycol) dimethacrylate.

42. The method of claim 41, wherein a polymerization initiator of the polymerization initiator system is an ammonium persulfate and tetramethylethylenediamine mixture.

43. The method of claim 42, wherein the plasticizer is at least one selected from the group consisting of glycerin, poly (ethylene glycol), poly (propylene glycol), polyoxyethylene (2) sorbitan mono-oleate, and mixtures thereof.

44. The method of claim 32, wherein the solvent is an alcohol.

45. The method of claim 44, wherein the plasticizer is selected from the group consisting of: glycerin, poly (ethylene glycol), polyoxyethylene (2) sorbitan mono-oleate, and poly (propylene glycol).

46. The method of claim 44, wherein said heating and pressurizing step is at a temperature less than 20° C. above the boiling point of the solvent.

47. The method of claim 46, wherein said heating and pressurizing step is at a pressure between 10 millitorr and 100,000 torr.

48. The method of claim 44, wherein the solvent is isopropyl alcohol.

49. The method of claim 48, wherein monomers in the monomer solution are methacrylamide and poly(ethylene glycol) dimethacrylate.

50. The method of claim 49, wherein a polymerization initiator of the polymerization initiator system is azobis isobutyronitrile.

51. The method of claim 50, wherein the plasticizer is at least one selected from the group consisting of glycerin, poly (ethylene glycol), poly (propylene glycol), polyoxyethylene (2) sorbitan mono-oleate, and mixtures thereof.

52. The method of claim 32, wherein the solvent is a glycol ether.

53. The method of claim 52, wherein the plasticizer is selected from the group consisting of: glycerin, poly (ethylene glycol), polyoxyethylene (2) sorbitan mono-oleate, and poly (propylene glycol).

54. The method of claim 52, wherein said heating and pressurizing step is at a temperature less than 20° C. above the boiling point of the solvent.

55. The method of claim 54, wherein said heating and pressurizing step is at a pressure between 10 millitorr and 100,000 torr.

56. The method of claim 52, wherein the solvent is propylene glycolmethyl ether.

57. The method of claim 56, wherein monomers in the monomer solution are methacrylamide and poly(ethylene glycol) dimethacrylate.

58. The method of claim 57, wherein a polymerization initiator of the polymerization initiator system is azobis isobutyronitrile.

59. The method of claim 58, wherein the plasticizer is at least one selected from the group consisting of glycerin, poly (ethylene glycol), poly (propylene glycol), polyoxyethylene (2) sorbitan mono-oleate, and mixtures thereof.

* * * * *